(12) United States Patent
Akens et al.

(10) Patent No.: US 8,542,194 B2
(45) Date of Patent: Sep. 24, 2013

(54) KEYPAD ASSEMBLY FOR A COMMUNICATION DEVICE

(75) Inventors: Jody H. Akens, Weston, FL (US); Salvador P. Magana, Wellington, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 388 days.

(21) Appl. No.: 12/871,622

(22) Filed: Aug. 30, 2010

(65) Prior Publication Data

US 2012/0050170 A1 Mar. 1, 2012

(51) Int. Cl.
*G09G 5/00* (2006.01)
*G09G 3/22* (2006.01)

(52) U.S. Cl.
USPC .......................................... 345/170; 345/183

(58) Field of Classification Search
USPC .......................... 345/170, 173, 178
See application file for complete search history.

(56) References Cited

U.S. PATENT DOCUMENTS

| | | | |
|---|---|---|---|
| 7,249,861 B2 | 7/2007 | Coleman et al. | |
| 2005/0202787 A1 | 9/2005 | Coleman et al. | |
| 2009/0122016 A1* | 5/2009 | Huang | 345/170 |
| 2009/0178906 A1 | 7/2009 | Liu et al. | |
| 2009/0194401 A1* | 8/2009 | Kim | 200/314 |

FOREIGN PATENT DOCUMENTS

| | | |
|---|---|---|
| KR | 1020080015640 A | 2/2008 |
| KR | 1020090005653 A | 1/2009 |
| KR | 100905232 B1 | 7/2009 |

* cited by examiner

*Primary Examiner* — Michael Faragalla
(74) *Attorney, Agent, or Firm* — Barbara R. Doutre (57) ABSTRACT

A keypad assembly (100) provides improved backlighting in a slim-line from factor with a minimal number of LEDs (130). The keypad assembly (100) utilizes side-firing LEDs (130) mounted to a keypad flex (112) which protrude through subsequent thin layers of substrates. A light-guide film (104) disposed over the layers includes corresponding cut-outs through which the side-firing LEDS partially protrude. The light-guide film includes light dispersion areas (114) formed thereon. A cover (102) seals the side-firing LEDs (130) protruding through the light-guide film (104). An interconnect flex (132) couples to the keypad flex (112) to provide flexible coupling of the keypad assembly to an electronic device. The light-guide film (104) provides both light dispersion and sealing to the keypad assembly (100).

19 Claims, 6 Drawing Sheets

KEYPAD ASSEMBLY FOR A COMMUNICATION DEVICE

FIELD OF THE DISCLOSURE

The present disclosure relates generally to communication devices and more particularly to keypad assemblies for handheld communication devices.

BACKGROUND

Communication devices, such as handheld two-way radios, cellular telephones and the like, often include a keypad as part of a user interface. While communication devices become smaller, the keypad design remains driven by human factors and usability. When designing communication devices which are expected to operate under adverse environments, sealing the keypad is also taken into consideration. Space constraints in portable communication devices make the implementation of a sealed keypad extremely challenging. Keypad assemblies incorporating backlighting further exacerbate the sealing challenge as the need for uniform illumination distribution must also be taken into account.

It is particularly important that handheld communication devices, such as battery operated two-way radios utilized by public safety personnel, operate under a variety of oftentimes adverse conditions within the public safety arena. As such, these types of devices demand higher performance factors including sealing, power consumption, backlighting, robustness and physical size which must be balanced with ease of manufacturing and cost. Many past keypad assemblies have been bulky and non-energy efficient.

Accordingly, it would be desirable to have a robust, water-sealed keypad assembly with improved backlighting which addresses the design and performance concerns for handheld communication devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein a keypad assembly which provides improved sealing and backlighting for a battery operated portable communication device, such as a handheld radio. A low-profile, robust, water sealed keypad assembly is provided by utilizing a light-guide film as the primary water seal along with side-firing light emitting diodes (LEDs) as the lighting source for the keypad backlighting. The handheld radio incorporating the keypad assembly formed in accordance with the various embodiments is particularly well-suited for use in a public safety environment.

Figure 1:
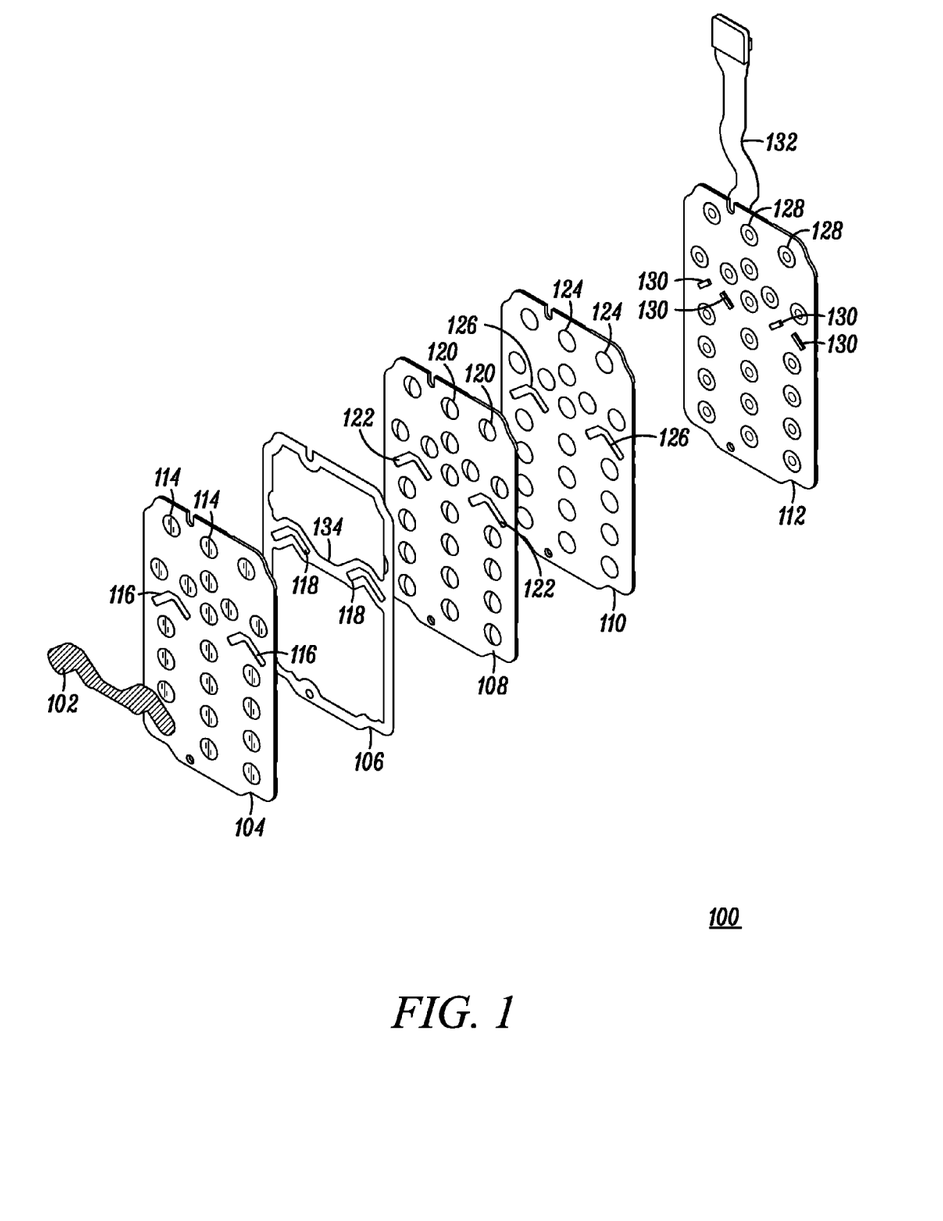
FIG. 1 shows an exploded view of a keypad assembly in accordance with an embodiment of the invention.

FIG. 1 is an exploded view of a keypad assembly 100 in accordance with an embodiment of the invention. Keypad assembly 100 comprises a light-guide film 104, a non-conductive substrate 108 having an array of contacts 120 disposed thereon, and a flex keypad circuit substrate 112 having an array of integrated conductive keypad traces 128 and a plurality of side-firing LEDs 130 populated thereon. An interconnect flex 132, described in further detail later, extends from a back surface of the flex keypad circuit substrate 112. The array of contacts 120 of the non-conductive substrate 108 align and provide actuation to the array of conductive keypad traces 128 of the flex keypad circuit substrate 112. The light-guide film 104 further provides light dispersion areas 114 embedded within the film. The light dispersion areas 114 correspond and align with the array of contacts 120 and corresponding keypad traces 128. The light-guide film 104 includes cut-outs 116 and the non-conductive substrate 108 includes corresponding cut-outs 122 through which to receive the side-firing LEDs 130. Keypad assembly 100 is assembled using sealing features which facilitate a slim line form factor.

To assemble the keypad assembly 100, a sealing feature 110, which is formed of a carrier and adhesive, is used to couple the non-conductive substrate 108 to the flex keypad circuit substrate 112. The carrier and adhesive may be formed of a variety of materials, for example Polyethylene Terephthalate (PET) film with acrylic adhesive can be used to provide a suitable sealing feature for a slim line configuration. Sealing feature 110 includes openings 124 that align between the contacts 120 and the keypad traces 128, thus allowing for electrical contact to be made when a contact is actuated. Sealing feature 110 also includes cut-outs 126 which align with cut-outs 122 of non-conductive substrate 108. Corresponding cut-outs 122, 126 form a seal around the base of side-firing LEDs 130 which will protrude therethrough upon coupling of the non-conductive substrate 108 to the flex keypad circuit substrate 112.

A perimeter sealing feature 106 is provided to couple the non-conductive substrate 108 to the light-guide film 104. The perimeter sealing feature 106 may be made of an acrylic piece part with adhesive or other suitable materials for a slim line form factor. The perimeter sealing feature 106 includes a bridging portion 134 having cut-outs 118 for providing a seal about the LEDs 130 which will protrude therethrough upon coupling of the perimeter sealing feature 106 to the non-conductive substrate 108. The perimeter sealing feature 106 is open on either side of the bridging portion 134, thereby permitting access to the array of contacts 120 from the light-guide film's light dispersion areas 114. As will be apparent in subsequent views, the bridging portion 134 divides the standard keypad features (0-9, * and #) from radio control keys. The side-firing LEDs 130 thus illuminate above and below the bridging portion 134.

The light-guide film 104 may be fabricated from known or yet to be developed light-guide film material, for example Polycarbonate or other suitable material may be used for a slim line profile. The only cut-outs in the light-guide film are the LED cut-outs 116 for providing a seal about the base of the side-firing LEDs 130 which will protrude therethrough upon coupling of the light-guide film 104 to the perimeter sealing feature 106. The side-firing LEDs 130 are slightly taller than the stack-up of the light-guide film 104 and dome array 108. As such, the side-firing LEDS 130 will partially protrude above light-guide film 104 in an assembled stack-up. The light dispersion areas 114 may be formed in a variety of ways, such as etched features on the film, embedded elements within the film, or any other suitable light dispersion means.

The keypad assembly 100 further comprises a cover 102 to place over the side-firing LEDs 130 protruding through the light-guide film 104. The cover 102 provides reflective and light-blocking properties to be described later. The cover 102 conforms over and around the side-firing LEDs 130 thereby sealing the LEDs to the light-guide film 104. As such, the light-guide film 104 is able to provide the primary sealing to the keypad assembly 100. Cover 102 may be formed of PET and acrylic adhesive or other similar materials suitable to a slim line profile.

In furtherance of a slim line assembly, a brief discussion of some of the above-mentioned components is provided. While the array of contacts 120 on non-conductive substrate 108 can be formed of any conductive contact material, the use of stainless steel popple domes helps protect against inadvertent key presses and also provides tactile feedback to a user when a key press has activated the switch.

The use of a flexible keypad substrate is highly desirable as flex material facilitates the integration of the keypad traces 128 to form individual switches in a slim line, low cost assembly. The keypad traces 128 are formed of interleaving conductive switch contact topographies which, when pressed upon by the corresponding conductive popple dome 120, closes the switch. The use of a flex keypad circuit substrate also facilitates sealing as will be discussed next.

Figure 2A:
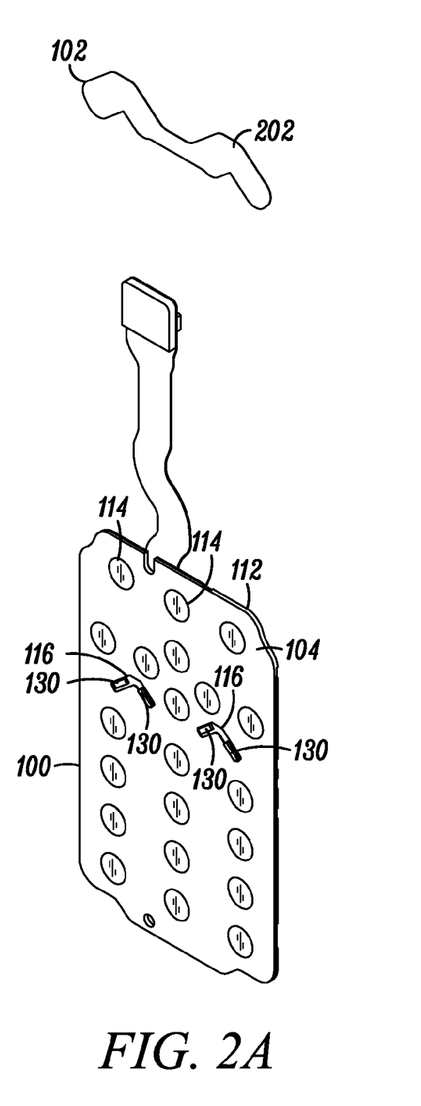
FIGS. 2A and 2B show an assembled view of the keypad assembly of FIG. 1 from the front with and without an LED cover in accordance with an embodiment.
Figure 2B:
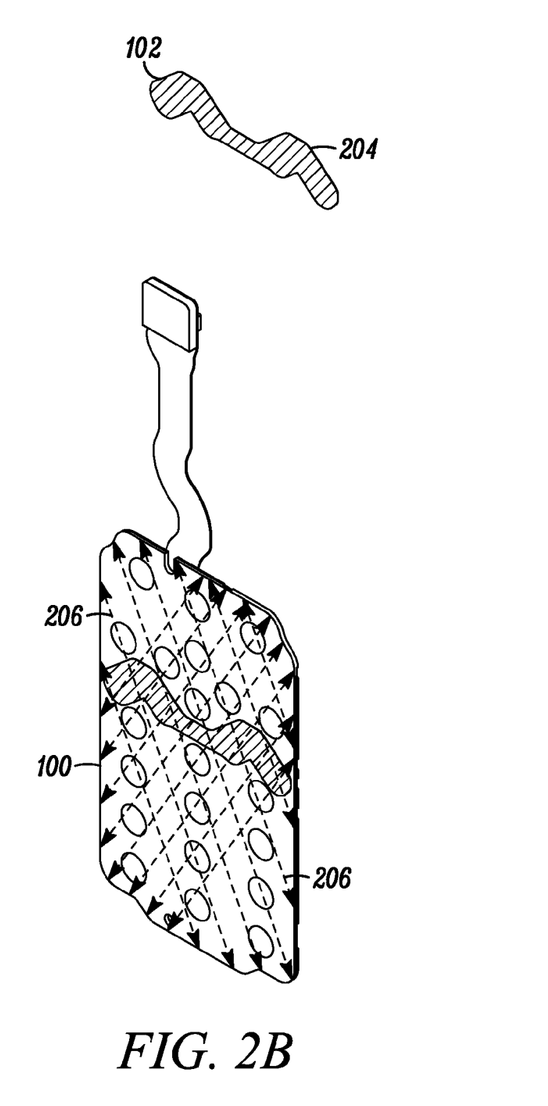

FIGS. 2A and 2B show an assembled view of the keypad assembly 100 of FIG. 1 with and without the cover 102 in accordance with an embodiment. As seen in FIG. 2A, the height of the side-firing LEDs 130 permit partial protrusion above light-guide film 104 through cut-outs 116. The cover 102 provides a reflective surface 202 to facilitate dispersion of light and a light-blocking surface to minimize the dispersion of light. The cover 102, as shown in FIG. 2A, is white on one side 202 and, as shown in FIG. 2B, black on another side 204. The white side provides the reflective surface 202 to facilitate dispersion of light while the black side provides the light-blocking surface 204 to minimize the transmission of light. The LED cover 102 is made of adhesive that conforms to the LED 130 protruding up slightly above light-guide film 104. The cover 102 is placed over the side-firing LEDs 130 such that the white side 202 faces towards the LEDs, and the black side 204 faces away from the LEDs. The LED cover 102 serves several purposes: reflecting the light (white), blocking non-reflected light from escaping (black), and sealing the LEDs from moisture (water, etc). The LED cover 102 adheres to the light-guide film 104 and LEDs 130. Thus, the cover 102 minimizes upward illumination from the side-firing LEDs 130 while providing a seal about the LEDs. The side-firing LEDs 130 shoot light into the light-guide film 104. The use of side-firing LEDs 130 which only slightly protrude about the light-guide film allows the cover 102 to provide a seal without blocking the light from shooting into the light-guide film 104.

While the selection of the number of side-firing LEDs 130 may be discretionary for some applications, in applications in which parts count, cost and current drain are at issue, then a minimum number of side-firing LEDs is desirable. As seen in FIG. 2A, the use side-firing LEDs 130 in conjunction with light dispersion areas 114 of light-guide film 104 and the LED layout provide optimized consistent backlighting, seen in FIG. 2B, utilizing a minimum number of LEDs. The light dispersion is represented by light dispersion lines 206 in FIG. 2B. In order to achieve even distribution of backlighting for a keypad used in a handheld communication device using a minimum number of LEDs, the embodiment shown in FIG. 2A utilizes four LEDs forming two side-by-side obtuse angled pairs of LEDs. The side-firing LEDs 130 are aligned to provide even light dispersion by forming a first obtuse angled pair of LEDs and a second obtuse angled pair of LEDs. The first obtuse angled pair of LEDs and the second obtuse angled pair of LEDs disperse light over the light dispersion areas 114 (above and below bridging portion 134 of FIG. 1). Obtuse angles are larger than a right angle and smaller than a straight angle (between 90° and 180°). The use light dispersion areas 114 formed on the film and the side-firing LEDs 130 laid out in the described formation optimizes back-lighting with a minimal number of components which reduces cost and facilitates sealing.

Figure 3A:
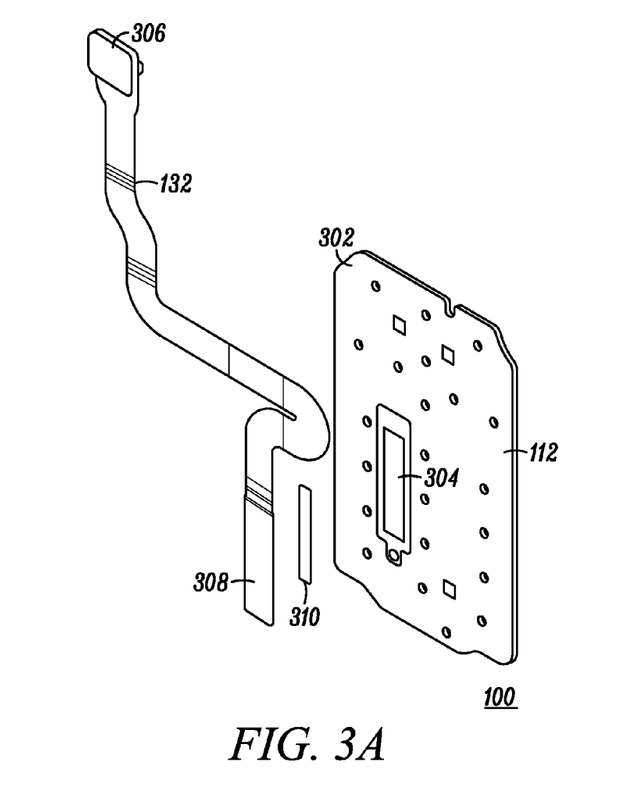
FIGS. 3A and 3B show an assembled view of the keypad assembly of FIG. 1 from the back along with an interconnect flex in accordance with an embodiment.
Figure 3B:
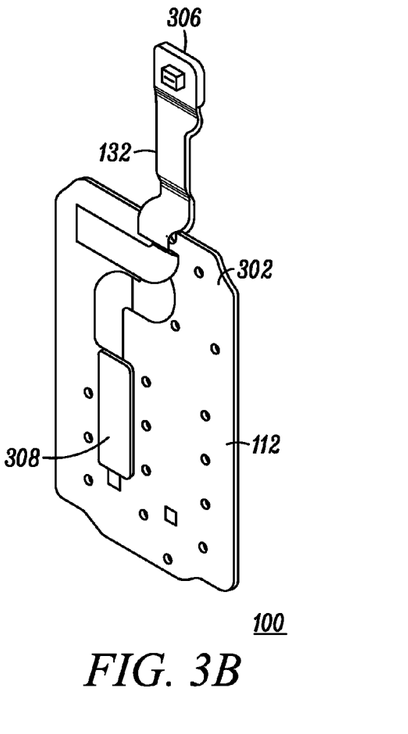

FIGS. 3A and 3B show an assembled view of the keypad assembly of FIG. 1 from the back along with the interconnect flex 132 in accordance with an embodiment. Keypad assembly 100 utilizes two flexes to facilitate sealing, the first flex being the flex keypad circuit substrate 112 and the second flex being the interconnect flex 132. The use of two flexes 112, 132 formed as separate piece parts facilitates assembly. As was seen in FIG. 1, the front surface of the flex keypad circuit substrate 112 includes the keypad traces 128 which face up towards the contacts 120 of the light-guide stack. Referring to FIGS. 3A and 3B, the back surface of the flex keypad circuit substrate 112 is shown in conjunction with the interconnect flex 132. The back surface of flex keypad circuit substrate 112 is covered with an adhesive backing 302 having an open area 304. The interconnect flex 132 is formed of a flexible ribbon-like piece part having conductive traces formed therein with a connector 306 coupled at one end for connecting to subsequent electronic devices and a flat-contact end 308 for mating with the flex keypad circuit substrate 112. The flat contact end 308 of interconnect flex 132 adhesively couples to the open area 304 to make electrical contact with the traces on the flex keypad circuit substrate 112. The ribbon-like nature of the interconnect flex 132 allows it to be folded and turned to so that connector 304 can make flexible, non-strained contact to electronic products. The interconnect flex 132 and the flex keypad circuit substrate 112 are bonded together using a strong sealant/adhesive material, such as Anisotropic Conductive Film (ACF), which permits electrical interconnect between the flex keypad circuit substrate 112 to they keypad interconnect flex 132. Bonding the two flexes 112, 132 in the manner described, allows the adhesive 302 on the back surface of the keypad flex 112 to seal the entire keypad flex to another surface, such as a chassis shown later without the use of an additional sealing component.

By utilizing two flexes, one on a top surface (the flex keypad circuit substrate 112 facing the light-guide film stack)

and the other interconnect flex 132 coupled to bottom surface (facing the chassis) facilitates assembling keypad assembly 100, facilitates mounting keypad assembly 100 to other products and facilitates sealing of the keypad assembly once mounted to the product while maintaining a slim line form factor. By utilizing only two flex layers 112, 132, along with appropriate layout and placement of e traces, vias, and busbars, allows the light-guide film 104 (of FIG. 1) to be used a seal.

Figure 4:
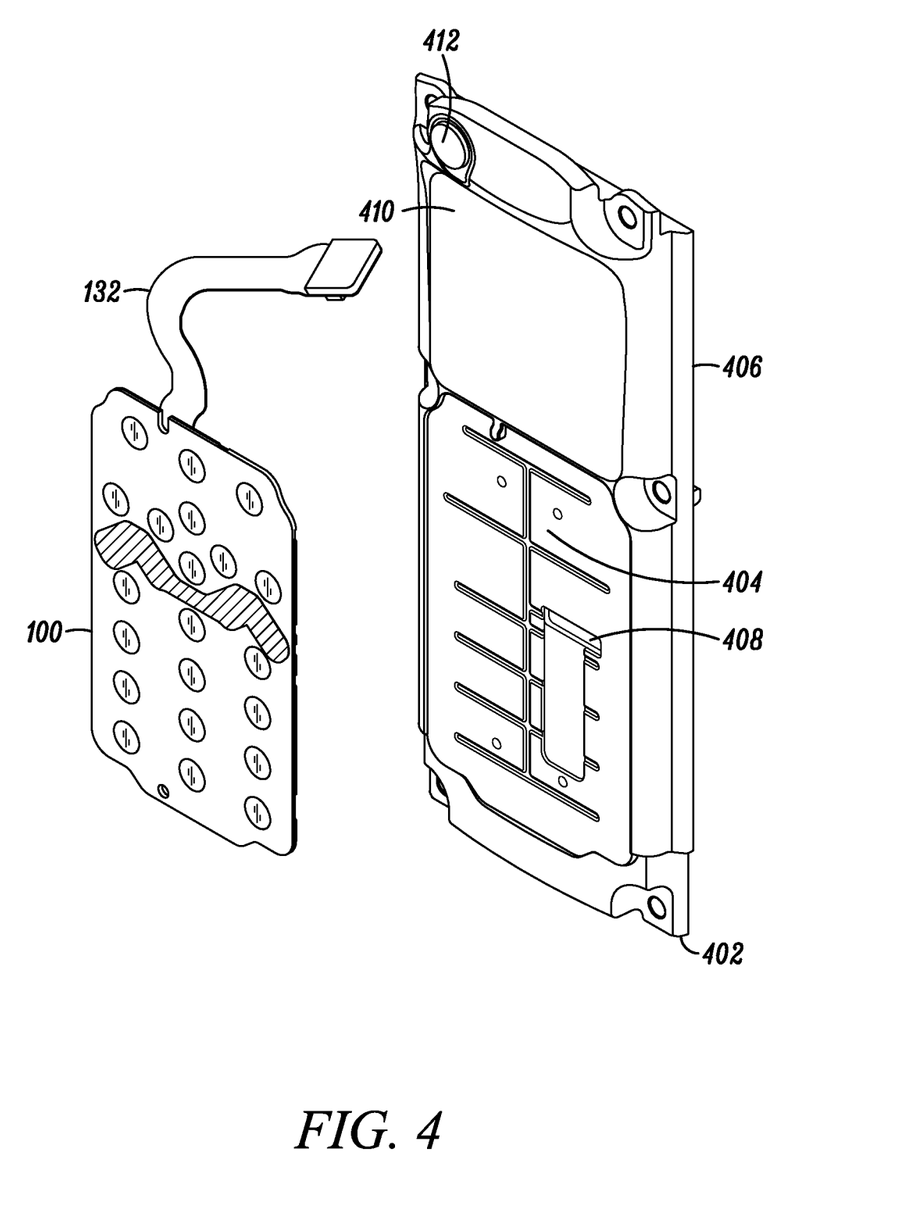
FIG. 4 shows an assembled view of the keypad assembly of FIG. 1 along with a chassis for a communication device in accordance with an embodiment.

The assembled layers forming keypad assembly 100 are shown again in FIG. 4 in conjunction with a radio chassis 402. Handheld battery operated two-way radios can incorporate the keypad assembly 100 and operate under adverse environments while maintaining a good seal with consistent keypad lighting distribution. The use of fewer LEDs provides for a more power efficient product conserving battery life while maintaining backlighting performance. For the purposes of an example only, an overall thickness of approximately 0.28+/−0.10 mm was achieved when a keypad assembly was formed in accordance with the embodiments of the invention using the following slim line form factor materials: PET of 0.05 mm thickness for the cover 102, Polycarbonate (PC) material of 0.125 mm for the light-guide film 104, PET and acrylic material of 0.05 mm thickness for the perimeter seal 106, PET and acrylic material of 0.025 mm thickness for the non-conductive substrate 108 with popple domes 120, PET and acrylic material of 0.05 mm thickness for the sealing feature 110, and flex material of 0.15 mm thickness for the flex keypad circuit substrate 112. The addition of the side-firing LEDs 130 added on approximately 0.12 mm thickness to the assembly above the surface of the light-guide film 104. The stack-up of the various layers beneath the light-guide film 104 accommodates the side-firing LEDs through the aligned openings 116, 118, 122, 126 such that a portion of the side-firing LED is able to disperse light through the light-guide film 104. The slim line profile provided by keypad assembly 100 further facilitates sealing and eliminates the bulkiness of past assemblies. Other applications may necessitate the use of other materials but the above combination is well suited for the ruggedized two-way radio environment and coupling to radio chassis 402.

Continuing to refer to FIG. 4, Radio chassis 402 may be formed of die casted aluminum or other suitable chassis material for handheld communication devices. Chassis 402 has a front/outer side 404 for receiving the keypad assembly 100 and a back/interior side 406 for coupling to a radio back housing (shown in FIG. 5) containing radio electronics. The slim line form factor of keypad assembly 100 allows it to be mounted to the chassis 402 using a suitable high bond adhesive material. The chassis 402 includes an opening 408 through which to pass the flex 132 to electrically couple the keypad assembly 100 to radio electronics located on the back side 406. The chassis 402 may further include a second opening 410 providing a window for a lens and display. A third opening 412 may also be provided within chassis 402 to accommodate a microphone. In accordance with the various embodiments, placement of the side-firing LEDs 130 outside the radio chassis 402 minimizes the number of LEDs required to light up a keypad thereby providing a more energy efficient approach than past keypad assemblies.

Figure 5:
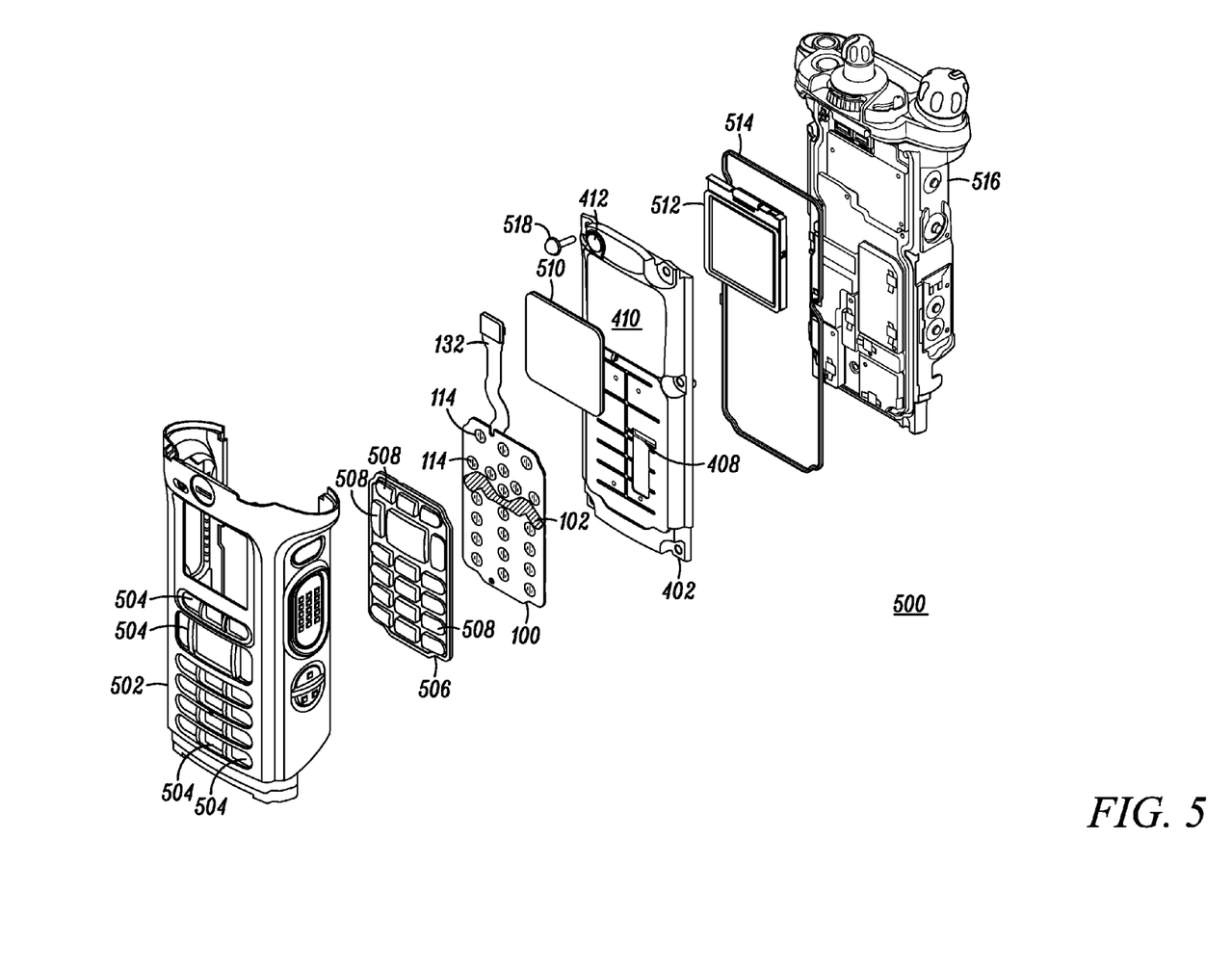
FIG. 5 shows an exploded view of a handheld communication device including the keypad assembly of FIG. 4 in accordance with an embodiment.

FIG. 5 shows an exploded view of a communication device 500 in the form of a battery operated handheld radio incorporating the keypad assembly 100 in accordance with an embodiment. Handheld radio 500 comprises first, second and third housing portions, shown as a front radio housing 502, chassis 302 and radio body 516. Front radio housing 502 may be formed of Polycarbonate (PC) or other suitable housing materials known or yet to be developed and includes apertures 504 formed therein for receiving a keypad 506 having keys 508. The keypad 506 may be formed of a variety of known or yet to be developed keypad materials, such as silicone materials. For example, a rubber silicon keypad with laser bumped out keys having transparent portions can be used to facilitate illumination from the side-firing LEDs 130. Keypad assembly 100 is aligned to adhesively couple to radio chassis 302 and be received within the front radio housing 502 having keypad 506 seated within the apertures 504.

Each light dispersion feature 114 of keypad assembly 100 aligns beneath a corresponding key 508 of the keypad 506. The keypad 506 is sandwiched between the front housing 502 and keypad assembly 100. The keypad assembly's side-firing LEDs (located beneath cover 102) provide even backlighting distribution to keypad 506.

Flex 132 of keypad assembly 100 passes through opening 408 of radio chassis 402 to couple to electronics within a radio body 516. A lens 510 adheres with the second opening 410 of the radio chassis 402. The lens 510 aligns with a display 512 which sits inside of the window within a casting. Radio body 516 contains radio electronics, such as a controller, transmitter and receiver. Third opening 412 receives a microphone 518. A coupling component 514, such as a compression molded silicone seal, or other suitable molded seal material known or yet to be developed, is used to couple the chassis 402 to the radio body 516.

The overall order of assembly for the radio 500 begins with the chassis 402 (having been pre-assembled with keypad assembly 100, lens 510, display 512, and microphone 518) being coupled to the radio body 516 using the interconnect flex 132 of the keypad assembly 100 to electronics inside radio body 516. The front of the radio is then assembled with front housing 502 (pre-assembled with keypad 506) over the chassis 402 snap fitting to radio body 516. The system is temporarily retained together by the housing 502 until the radio assembly is finished with screws on the reverse side (not shown).

Figure 6:
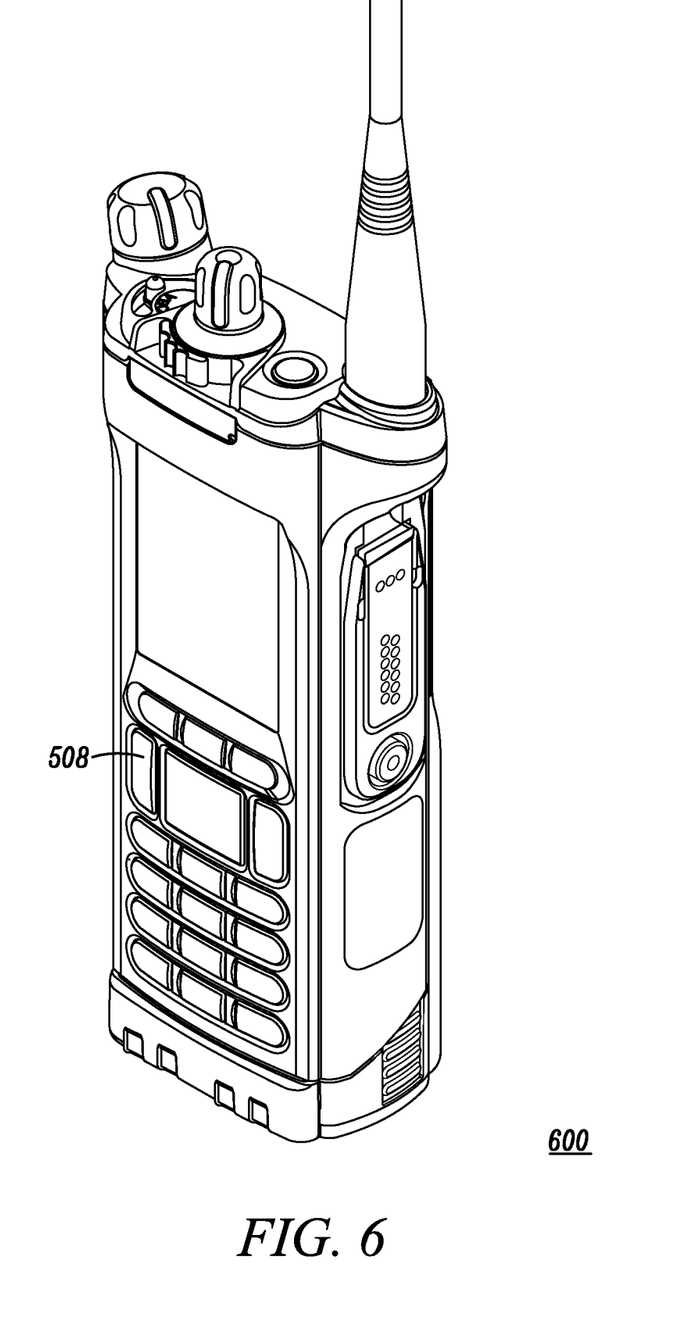
FIG. 6 shows an exploded view of a handheld communication device incorporating the keypad assembly of FIG. 4 in accordance with an embodiment.

FIG. 6 shows a handheld radio 600 in an assembled state incorporating the keypad assembly 100 in accordance with an embodiment. Radio 600 is thus provided with proper keypad sealing which provides even distribution of backlighting and protects the radio body's interior electronics. Even if moisture were able to infiltrate under the keypad 506, the sealed nature of the keypad assembly 100 and the location of the sealed keypad assembly 100 outwards from the radio chassis 402 prevents moisture from getting to the interior of the radio body 516 and the electronics therein.

Accordingly there has been provided a low-profile, robust, water sealed keypad assembly which utilizes a light-guide film as the primary water seal along with side-firing LEDs as the lighting source for keypad backlighting. The keypad assembly, though its strategic use of separate stacked flex layers, lends itself well to a slim profile which facilitates assembly and mounting within a communication device and minimizes the number of required seals. Placement of the side-firing LEDs outside the radio body minimizes the number of LEDs further making the assembly energy efficient. The ease of manufacturing and the use of fewer components provide a significant cost benefit over past bulky and non-energy efficient approaches. Handheld communication devices, such as battery operated two-way radios, can incorporate the keypad assembly of the various embodiments and operate under adverse environments while maintaining a good seal and even keypad lighting distribution.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A keypad assembly, comprising:
   a plurality of side-firing Light Emitting Diodes (LEDs) mounted to a flex keypad circuit and protruding through a plurality of keypad substrate layers mounted to the flex keypad circuit, wherein the plurality of side-firing LEDs form side-by-side obtuse angled pairs of LEDs;
   a light-guide film disposed over the plurality of keypad substrate layers, the lighguide film comprising cut-outs through which the plurality of side-firing LEDS partially protrude, the light-guide film further comprising light dispersion areas disposed thereon; and
   a cover sealing the plurality of side-firing LEDs to the light-guide film such that the light-guide film seals the plurality of keypad substrate layers, the plurality of side-firing LEDs dispersing light through the light-guide film to the light dispersion areas to illuminate a keypad.

2. An assembly for a keypad, comprising:
   a flex keypad circuit with side-firing Light Emitting Diodes (LEDs) populated thereon and an array of conductive keypad traces integrated thereon, wherein the side-firing LEDs form side-by-side obtuse angled pairs of LEDs;
   a non-conductive substrate having an array of contacts coupled thereto, the array of contacts aligning and providing actuation to the array of conductive keypad traces, the non-conductive substrate having cut-out portions through which the side-firing LEDs protude;
   a light-guide film adhesively coupled to the non-conductive substrate, the light-guide film having cut-outs through which the side-firing LEDs partially protrude;
   a cover sealing the side-firing LEDs to the light-guide film; and
   a keypad coupled to the lighguide film, the keypad being illuminated via the side-firing LEDs dispersing light through the light-guide film.

3. The assembly of claim 2, wherein the light-guide film includes light dispersion areas embedded therein.

4. The assembly of claim 3, wherein the light dispersion areas comprise predetermined etched areas aligned under each key of the keypad and through which light is dispersed from the side-firing LEDs.

5. The assembly of claim 2, wherein the flex keypad circuit has four side-firing LEDs populated thereon, the four side-firing LEDs forming two side-by-side obtuse angled pairs of LEDs.

6. The assembly of claim 5, wherein the cover provides a seal about the four side-firing LEDs to the light-guide without blocking light dispersion through the light-guide.

7. The assembly of claim 2, wherein the cover has a white side inside facing the side-firing LEDs and a black side facing away from the side-firing LEDs.

8. The assembly of claim 7, wherein the white side of the LED cover reflects light generated from the side-firing LEDs while the black side of the LED cover provides a light-blocking surface to minimize the transmission of light.

9. The assembly of claim 2, further comprising:
   a perimeter sealing feature coupling the light-guide film to the non-conductive substrate having the array of contacts, and the perimeter sealing features having a bridging portion with openings for sealing around the side-firing LEDs.

10. The assembly of claim 2, further comprising an interconnect flex for coupling the flex keypad circuit to subsequent electronics.

11. The assembly of claim 2, further comprising:
    light dispersion areas onto the light-guide film, each light dispersion feature aligning with a key of the keypad; and
    wherein the side-firing LEDs are disposed on the flex keypad circuit to form first and second pairs of side-by-side obtuse angled side-firing LEDs; and
    wherein the cover conforms over the side-firing LEDs to provide a light reflecting surface dispersing light through the light dispersion areas of the light-guide film, and the cover further provides a light-blocking surface minimizing upward illumination from side-firing LEDs.

12. A keypad assembly for a communication device, comprising:
a first housing portion of the communication device;
a keypad coupled to the first housing portion;
a second housing portion located behind the keypad; and
a keypad assembly stack-up located between the keypad of the first housing portion and the second housing portion, the keypad assembly stack-up comprising:
a flex keypad circuit having a plurality of side-firing Light emitting Diodes (LEDs) and a keypad trace populated thereon;
a popple dome disposed on a non conductive substrate, the popple dome being aligned with the keypad trace of the flex keypad circuit;
a light-guide film having light dispersion areas embedded therein and a cut-out feature, the light dispersion areas being aligned with the popple dome, and the cut-out feature being aligned with the side-firing LEDs;
a cover sealing the side-firing LEDs to the light-guide film without blocking light dispersion from the side-firing LEDs through the light-guide film; and
the keypad being illuminated by the side-firing LEDs dispersing light through the light dispersion areas of the light-guide film.

13. The keypad assembly of claim 12, wherein the first housing portion comprises a front radio housing, and the second housing portion comprises a radio chassis, the keypad assembly being coupled between the front radio housing and the radio chassis.

14. The keypad assembly of claim 13, further comprising:
an interconnect flex electrically coupled to the flex keypad circuit;
an opening formed in the radio chassis; and
wherein the interconnect flex passes through the opening of the radio chassis to electrically couple the keypad assembly to radio electronics located behind the radio chassis.

15. A handheld radio, comprising:
a front radio housing having a keypad;
a radio chassis;
a back radio housing having radio electronics enclosed therein;
a keypad assembly coupled outside of the radio chassis to the front radio housing, the keypad assembly comprising:
a flex keypad circuit with keypad traces and a plurality of side-firing LEDs disposed thereon, wherein the plurality of side-firing LEDs form side-by-side obtuse angled pairs of LEDs;
a non-conductive substrate having an array of keypad actuators for making contact with the keypad traces in response to being pressed, the non-conductive substrate having cut-outs through which the plurality of side-firing LEDs protrude;
a light-guide film disposed on the non-conductive substrate, the light-guide film having corresponding cut-outs through which the plurality of side-firing LEDS partially protrude, the light-guide film having plurality of light dispersion areas formed thereon; and
a cover sealing the plurality of side-firing LEDs to the light-guide film, the plurality of side-firing LEDs dispersing light through the plurality of light dispersion areas to the keypad, and light-guide providing a seal to the keypad assembly.

16. The handheld radio of claim 15, the plurality of side-firing LEDs comprise a first obtuse angled pair of LEDs and a second obtuse angled pair of LEDs.

17. The handheld radio of claim 16, wherein the first obtuse angled pair of LEDs and the second obtuse angled pair of LEDs disperse light through the plurality of light dispersion areas, the plurality of light dispersion areas dispersing the light through the keypad.

18. The handheld radio of claim 15, wherein the handheld radio comprises a battery operated two-way radio.

19. The handheld radio of claim 15, further comprising:
an interconnect flex coupled to the flex keypad circuit, the interconnect flex coupling the keypad assembly to radio electronics accessible through the opening of the radio chassis.

* * * * *